James R. Baird's Wheel

No. 117142. Patented Jul 18 1871.

*Reissued Sept. 26th 1871.* 117,142

UNITED STATES PATENT OFFICE.

JAMES R. BAIRD, OF VINCENNES, INDIANA.

IMPROVEMENT IN WHEELS FOR VEHICLES.

Specification forming part of Letters Patent No. 117,142, dated July 18, 1871.

*To all whom it may concern:*

Be it known that I, JAMES R. BAIRD, of Vincennes, in the county of Knox and in the State of Indiana, have invented certain new and useful Improvements in Wheels; and do hereby declare that the following is a full, clear, and exact description thereof, reference being had to the accompanying drawing and to the letters of reference marked thereon making a part of this specification.

The nature of my invention consists in the construction and arrangement of a wheel for vehicles, as will be hereinafter more fully set forth.

In order to enable others skilled in the art to which my invention appertains to make and use the same, I will now proceed to describe its construction and operation, referring to the annexed drawing, in which—

Figure 1:
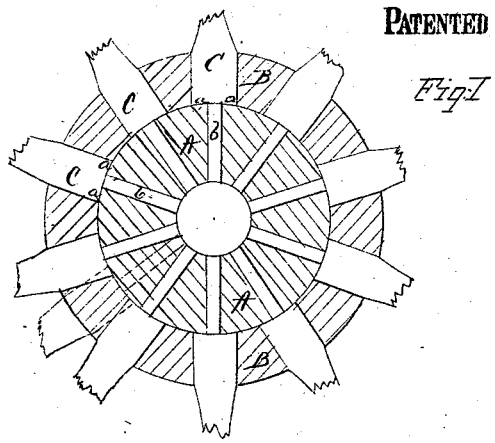
Figure 2:
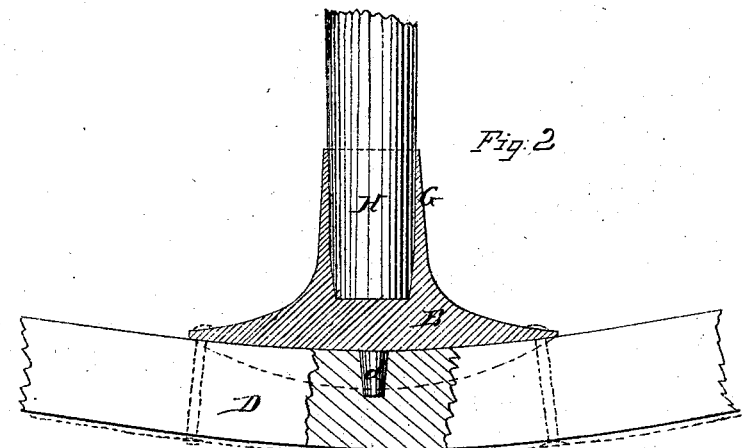
Figure 3:
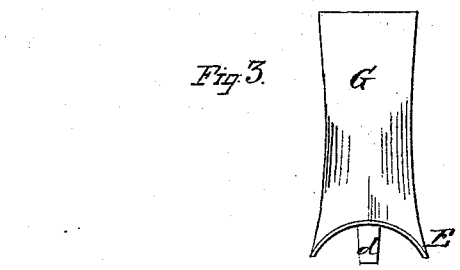

Figure 1 is a transverse vertical section of the hub. Fig. 2 is a view of a portion of the felly, showing the mode of attaching the spoke; and Fig. 3 is a side view of the felly-plate and spoke-socket by which the spoke is attached to the felly.

A represents the wooden hub, which is driven into a metallic ring B, having two rows of holes in staggered form, and into which the spokes C C are firmly driven the full size of the spokes. The spokes C C have a shoulder, $a$, resting upon the wooden hub A, and a tenon, $b$, passing into said hub. D represents the felly, on the inner side of which is placed the felly-plate E. This plate is concave to fit the felly with a pin, $d$, projecting from its center into a hole in the felly, as shown. This plate is to be secured to the felly by means of two bolts passing through its extreme ends, said bolts also fastening the tire on the wheel. From the inner side of the felly-plate E projects a socket, G, into which the spoke H is inserted, as shown in Fig. 2, the felly-plate and spoke-socket being made of one piece.

Having thus fully described my invention, what I claim as new, and desire to secure by Letters Patent, is—

A wheel for vehicles, composed of the hub A, ring B, spokes C C with shoulders $a\ a$ and tenons $b\ b$, the felly D, and felly-plate E with pin $d$, and spoke-socket G, all constructed and arranged substantially as and for the purposes herein set forth.

In testimony that I claim the foregoing I have hereunto set my hand this 4th day of February, 1871.

JAMES R. BAIRD.

Witnesses:
W. H. DEWOLF,
JEROME CONVERSE.